Figure 1:
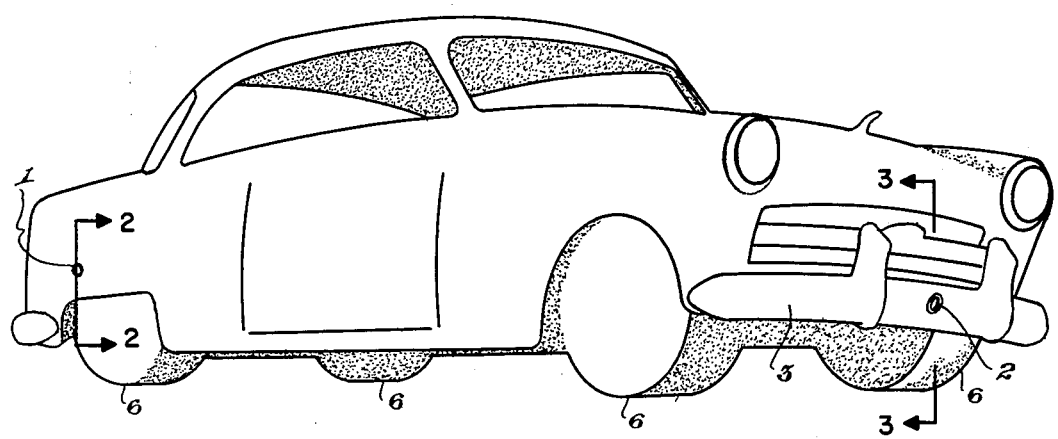

March 27, 1956    A. E. THOMPSON ET AL    2,739,784
VEHICLE MOUNTED JACK
Filed June 5, 1953

INVENTORS
ALBERT E. THOMPSON
WILLIAM E. THOMPSON
BY
*J. Stuart Freeman.*
ATTORNEY

2,739,784

VEHICLE MOUNTED JACK

Albert E. Thompson and William E. Thompson, Darby, Pa.

Application June 5, 1953, Serial No. 359,680

3 Claims. (Cl. 254—86)

The object of the invention is to provide improvements broadly in means for elevating vehicles but more specifically in jacks for automobiles, and still more specifically in jacks that are carried as a unitary part of such vehicles.

Most if not all of the great mass of adults throughout the country today, who drive or are driven in automobiles, have no doubt had numerous occasions, when for one reason or another a tire on the car in which they are riding, has had to be changed and which changing has been necessary under weather conditions that are unpleasant, or even disastrous as far as their clothing is concerned, to say nothing of the all too frequent absence of a jack from the car when needed, heat, rain, sleet, snow and such factors.

Even if a jack is readily available, it is necessary to provide an substantially unyielding support for it, and to locate it under a relatively rigid part of the car, after which one must necessarily raise the chassis or the body of the car frequently as much as two feet, in order to lift the wheel sufficiently to permit the tire to clear the road or other supporting surface, and the successful completion of such an operation having involved one or more abortive attempts, during which the jack may have tilted and fallen upon its side, thereby dropping a partially raised car body ofttimes with regrettable if not actually disastrous results.

Another and more specific object, therefore is to provide for the fixed unitary mounting of an especial type of accordion or expansion jack on and rigidly secured preferably to each of the axles of the car, in combination with a rotatable shaft carried by said body, a flexible coupling between said shaft and said jack, and detachable manually actuatable means for operatively rotating said shaft both in car-lifting and then in car-lowering actions.

A further object is to provide for this improved combination of elements a jack, that in itself comprises a duplicate pair of oppositely positioned pivotally connected links, means to pivotally secured the upper free ends of one link of each of said pair to either the forward or rearward axle of a car, means engageable with the ground or other surface supporting the car, and to which the opposite ends of the lower free end of the other of said links are pivotally secured, and a rotable screw longitudinally fixed with respect to the adjacent ends of the links of one of said pairs, and in threaded engagement with a suitable coupling or threaded sleeve jointly carried by the adjacent ends of the links of the other of said pairs, together with detachable means for manually rotating said screw, alternately in opposite directions, so as to thereby bring toward each other the adjacent ends of the links of both of said pairs to lift the car, and to separate the adjacent ends of the links of said pairs to permit said car to descend.

Still another object is to provide the combination of a vehicle, with an accordion type jack, a fixed cover plate secured to the chassis of said vehicle and to which said jack is secured, a tray adapted to contain lubricant and secured to the lower and vertically adjustable portions of said jack, said tray when in its uppermost collapsed position being closed by said cover plate, one wall of said tray being provided with a substantially U-shaped aperture opening through the upper edge of said wall, the rotatable screw for operating said jack being movable vertically in said aperture, as said jack is projected downwardly and then returned to its uppermost inoperative position, and a sealing plate carried by said screw and at all times closing that part of said opening that surrounds said screw.

Figure 2:
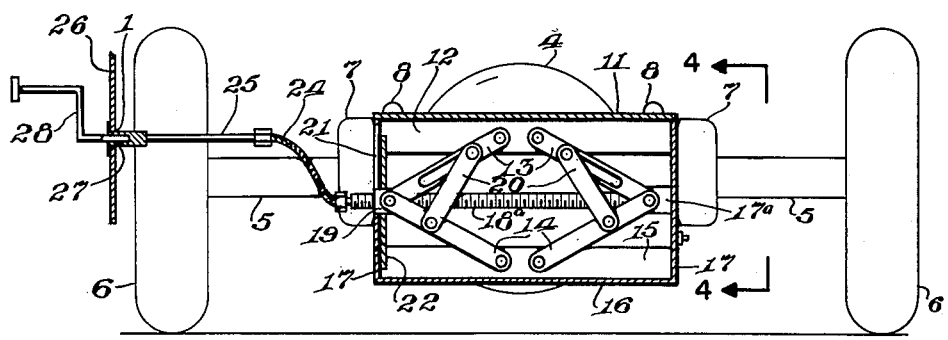
Figure 3:
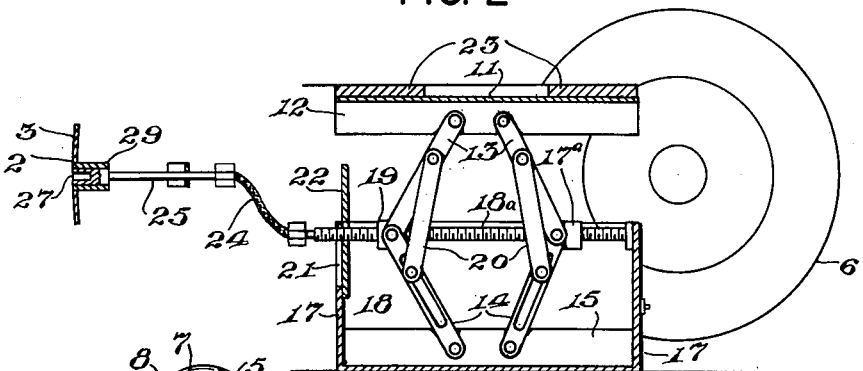
Figure 4:
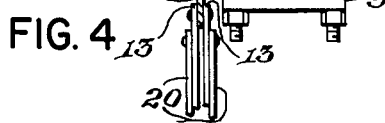

With the objects thus briefly set forth, the invention comprises further details of construction and operation, which are hereinafter fully described in the following specification, when read in conjunction with the accompanying drawings, in which Fig. 1 is a perspective view of a representative automobile equipped with the improved jacks; Fig. 2 is a vertical section substantially on the line 2—2 of Fig. 1 and showing the mounting and means of operation of the rear jack; Fig. 3 is a vertical section substantially on the line 3—3 of Fig. 1 and showing the mounting and means for operating the forward jack; and Fig. 4 is a section substantially on the line 4—4 of Fig. 2.

Referring to the drawings, an automobile is shown as representative of any type of vehicle to which the improved jacks can be attached, and shows in one side of its body an aperture 1 and a second aperture 2 in its forward bumper 3, both being illustrative of optional positions in which can be located the openings through which a manually rotatable lug- or socket-wrench can be inserted for operating said jacks.

Referring specifically to Fig. 2, the rear axle is shown as being provided with the usual differential housing 4, from which extend in opposite directions the usual shaft housings 5, upon which are mounted the wheels 6. Partially surrounding said shaft housings, or intermediate enlargements 7 of the same, are a pair of spaced inverted U-brackets 8 to and between the depending ends of which are plates 9. Secured to the forward side of each of said U-brackets is the vertical flange 10 of an angle iron, whose rearwardly directed horizontal flange 11 extends longitudinally of said rear shaft, and is provided at its approximately transverse central point with a depending flange 12, which serves to stiffen the structures and also form a support for the elements of the accordion jack that is supported thereby. Figs. 2 and 4 are slightly different in that the member 11 is secured directly by any suitable means, such as welding, to the axle casing, whereas in Fig. 4 its position is somewhat lower and is secured to said U-brackets by mean of said vertical flange 10.

In either case, there are pivotally secured to said depending flange 12 and preferably upon each of its opposite sides a pair of links 13, to the lower ends of which are pivotally secured lower pair of links 14, that are in turn pivotally secured to an upwardly directed flange 15, carried by a ground-engageable plate 16. This last-mentioned plate is peripherally surrounded by continuous upstanding end and side flanges 17 and 18, respectively, that when in its uppermost position said last-mentioned plate cooperates with the horizontal element 11 to form a box-like housing normally completely enclosing said jack when in upper or retracted and inoperative position (Fig. 2), but which plate 16, when in lowered position (Fig. 3) and in engagement with the ground or any other suitable supporting surface, functions as a firm support for the adjacent end of the vehicle when in raised position, prevents tilting of the vehicle to one side or the other, and spans irregularities such as ridges and recesses in such surface.

The adjacent ends of the links of each of said pairs upon one side of the jack are pivotally secured to a coupling 17a that has a threaded bore in which is rotatably secured one end of a combined right- and left-hand screw shaft 18a the opposite end portion of said screw shaft being in threaded engagement with a similarly threaded bore in a coupling 19, to which are pivotally secured the adjacent ends of the links 13 and 14 of the oppositely positioned pairs. It will also be noted that intermediate portions of the links of each such pair, upon the opposite sides of said screw shaft and said flanges 12 and 15, are connected together by tie links 20, which at one end in each instance are pivotally secured to the respectively adjacent links 13, while at their opposite ends they are both pivotally and slideably secured to intermediate portions of the lower links 14 of each pair.

It will be noted that the screw shaft projects through one end wall 17 of the lower section 16—18 of said jack housing, and it must rise and fall with respect to said housing, as the vehicle is respectively raised or lowered by the jack, a vertical slot 21 is provided in said wall, and to cover the exposed portions of this slot at all times, so that lubricant cannot escape from within said housing, nor dust and other foreign matter enter it and thereby hasten the wearing away of its parts, a slideable closure plate 22 is provided. This plate is supported by said screw shaft which extends rotatably through it, and is maintained in slideable engagement with said end wall by any suitable means, as for example by rabbeted grooves, headed bolts or rivets slideable within parallel slots, or the like, but which being a mere detail of construction, and dependent upon the preference of the manufacturer, are not shown specifically.

In considering Figs. 2 and 3, it is to be understood that they are substantial duplicates in construction, while they do in fact operate and function as duplicates. However, whereas the closure plate 11 of the rear jack housing support is shown in Fig. 2, as being secured to the adjacent axle and differential housing, the corresponding plate of the forward jack housing is shown in Fig. 3, as being fixedly and operatively supported in depending position from transversely extending unitary elements 23 of the vehicle frame. In either case the operation and function of the several elements are the same, and therefore in order to save unnecessary multiplicity of the drawings the jacks are shown in these figures as being relatively collapsed and operatively extended, as though they were the same jack, the only difference being in their respective connections to the vehicle itself.

Connected to the outer free end of the screw shaft of each of said jack units is a flexible shaft section 24, the outer end of which is secured to one end of a rigid drive shaft 25, whose opposite outer end is rotatably positioned in fixed longitudinal relation with the adjacent body plates 26 of said vehicle and therefore with the aperture 1 positioned therein. The end of this last-mentioned shaft is provided with a polygonally shaped bore 27 that extends inwardly from its free end and is adapted to receive the similarly shaped end portion of the lug- or socket-wrench 28. The same construction is shown in Fig. 3 for the forward jack, except that the free end of said rigid drive shaft is secured against longitudinal shifting yet rotatably with respect to an inwardly extending sleeve 29 carried by the bumper 3 in alignment with the aperture 2 therein. It will also be noted that the axes of said drive shafts are preferably not in vertical alignment with the respective screw shafts of said jacks, and the rear body aperture 1 is shown as being higher from the ground than the forward aperture 2, wherefore the apparently similar positions of the flexible shafts in Figs. 2 and 3 are not inconsistent.

In the general function and operation of this improved jack, it will be realized that whereas accordion jacks have long been known in a general way, as far as is known they have never been substantially completely housed when in retracted inoperative position, so as to maintain them fully lubricated and at the same time protect them from the dust of the highways, and both of such attainments assuring greatly less wear during normal use, and resultingly much longer life without requiring replacement or repair.

Having thus described our invention, what we claim and desire to protect by Letters Patent of the United States is:

1. The combination of a vehicle, with a scissors-type jack, an upper cover plate to which said jack is secured, a hollow tray adapted when in lowered position to engage the ground, said tray comprising an end wall provided with a generally U-shaped aperture opening through its upper edge, an operating screw extending rotatably through said opening and relatively vertically moveable therein, as said tray rises and falls during the operation of said jack, and a vertically reciprocatory sealing plate receiving said screw and covering said opening at all times to prevent lubricant escaping from within said tray.

2. The combination of a vehicle, with a scissors-type jack comprising oppositely directed pairs of pivotally connected links, a tray adapted to contain lubricant, the upper free ends of the upper links of said pairs being pivotally secured to said vehicle and in spaced relation with respect to each other, the lower free ends of the other links of said pairs being pivotally connected in spaced relation with respect to each other through said tray, a screw rotatably secured to and in threaded relation with the pivotal connections between the links of said pairs, means to rotate said screw, and means extending between and pivotally connecting the links of each pair and crossing said screw, to increase and maintain the rigidity of the jack as a unit.

3. The combination of a vehicle, with a scissors-type jack comprising oppositely directed pairs of pivotally connected links, the upper free ends of the upper links of said pairs being pivotally secured to spaced portions of said vehicle, a four-walled tray adapted to contain lubricant and having a vertical slot in one wall, a fixed cover plate closure for said tray secured to said vehicle above said links, the lower free ends of the other links of said pairs being pivotally connected together through spaced portions of said tray, and a combined right-, left-hand screw movable vertically in said slot and in threaded engagement with the pivotal connections between said links, and said tray when in raised position cooperating with said closure to house said jack when in its upper collapsed position, and a vertically reciprocatory sealing plate revolvably receiving said screw and covering said opening at all times to prevent lubricant escaping from within said tray.

References Cited in the file of this patent

UNITED STATES PATENTS

| | | |
|---|---|---|
| 1,429,945 | Hern | Sept. 26, 1922 |
| 1,714,464 | Merriman | May 21, 1929 |
| 2,467,657 | Brown | Apr. 19, 1949 |
| 2,535,407 | Genesen | Dec. 26, 1950 |
| 2,587,094 | Berg et al. | Feb. 26, 1952 |

FOREIGN PATENTS

| | | |
|---|---|---|
| 906,618 | France | May 22, 1945 |